United States Patent
Ogawa et al.

[11] Patent Number: 5,916,395
[45] Date of Patent: Jun. 29, 1999

[54] METHOD FOR FABRICATING CERAMIC ELECTRONIC PARTS

[75] Inventors: Mamoru Ogawa; Takashi Noji; Keiichi Inoue, all of Takefu, Japan

[73] Assignee: Murata Manufacturing Co., Ltd., Japan

[21] Appl. No.: 08/804,896

[22] Filed: Feb. 24, 1997

Related U.S. Application Data

[63] Continuation-in-part of application No. 08/498,179, Jul. 5, 1995, abandoned.

[30] Foreign Application Priority Data

Jul. 5, 1994 [JP] Japan .................................. 6-177525

[51] Int. Cl.⁶ .................................................. B32B 31/00
[52] U.S. Cl. ..................... 156/89.11; 156/155; 156/291; 156/297; 29/885
[58] Field of Search .............................. 156/89, 152, 235, 156/237, 241, 247, 280, 297, 344, 291, 89.11, 155; 118/500; 427/58; 29/25.01, 25.03, 25.42, 885

[56] References Cited

U.S. PATENT DOCUMENTS

| | | | |
|---|---|---|---|
| 3,765,431 | 10/1973 | Jannett et al. | 134/113 |
| 4,064,606 | 12/1977 | Dunn | 29/25.42 |
| 4,192,061 | 3/1980 | Masuzima et al. | 29/854 |
| 4,395,184 | 7/1983 | Braden | 414/417 |
| 4,664,943 | 5/1987 | Nitta et al. | 427/58 |
| 5,130,067 | 7/1992 | Flaitz et al. | 156/89 |
| 5,383,997 | 1/1995 | Minowa et al. | 156/235 |
| 5,547,622 | 8/1996 | Chalasani et al. | 156/89 |

FOREIGN PATENT DOCUMENTS

| | | |
|---|---|---|
| 2628327 | 4/1978 | Germany. |
| 3441984 | 5/1985 | Germany. |
| 4209385 | 5/1993 | Germany. |
| 3705279 | 11/1994 | Germany. |

*Primary Examiner*—Jeff H. Aftergut

[57] ABSTRACT

A method for fabricating ceramic electronic parts allows external electrodes to be baked onto the electronic parts without overlaying powder on the sagger. An adhesive material layer is provided on a surface of a sagger on which electronic parts are placed. The sagger is inserted into a firing oven with the electronic parts adhesively fixed onto the adhesive material layer, whereby the external electrodes of the electronic parts are baked. The adhesive layer burns away during the firing process. The method including such steps eliminates the need of overlaying powder onto the sagger, so that no powder sticks to the external electrodes after baking, so that the process of removing powder is no longer necessitated.

8 Claims, 6 Drawing Sheets

METHOD FOR FABRICATING CERAMIC ELECTRONIC PARTS

CROSS-REFERENCE TO RELATED APPLICATION

This is a continuation-in-part of Ser. No. 08/498,179 filed Jul. 5, 1995, now abandoned, the disclosures of which are incorporated by reference herein.

BACKGROUND OF THE INVENTION

1. Field of the Invention

The present invention relates to a method for fabricating ceramic electronic parts and, more particularly, to a method of firing external electrodes with which ceramic electronic parts are coated.

2. Description of the Prior Art

Ceramic electronic parts, for example, monolithic ceramic capacitors are fabricated through the steps of stacking and pressurizing a required number of ceramic green sheets coated with internal electrodes, cutting and firing the stacked sheets, and then applying and baking external electrodes.

The process of baking an external electrode has conventionally been carried out in the following manner. As shown in FIG. 6A, a powder 2 of alumina or zirconia that hardly reacts with the external electrode is overlaid to a specified thickness on a surface of a sagger 1 that reacts with the external electrode. On this powder 2, a multiplicity of electronic parts 3 coated with an external electrode are placed, and further dried. The sagger 1 is inserted into a firing oven and heated at a temperature below 1000° C., whereby the external electrode is baked.

Alternatively, a separator in the form of a thin sheet having alumina or zirconia powder contained therein may also be used instead of the powder 2.

The powder 2 or the separator is used so that the sagger 1 and the electronic parts 3 will not contact each other. However, there are some cases where the powder sticks to the external electrode during the baking process because the external electrode contains glass components. This necessitates a process of removing the powder which stays on the external electrode, and this process leads to a problem of increased cost.

Also, the electronic parts 3 contained in the sagger 1 cannot be immobilized (i.e., the electronic parts cannot be prevented from moving in the sagger 1). Therefore, the electronic parts cannot be prevented from contacting one another as shown in FIG. 6B during handling, such that the parts may come into contact with one another at portions of the external electrodes 4 after the baking process. Furthermore, the use of powder causes dust generation, worsening the working environment for the fabricating processes of electronic parts, which is another problem.

SUMMARY OF THE INVENTION

It is therefore an object of the present invention to provide a method for fabricating ceramic electronic parts, which involves no occurrence of powder adhesion to the external electrodes, so that the need of removing the powder is eliminated, and which can solve the problems which arise due to the external electrodes sticking to each other and due to the dust of the powder.

To achieve the above object, the method of the present invention includes steps of providing an adhesive material layer on the sagger surface, and baking the external electrodes with the ceramic electronic parts coated with the external electrodes being adhesively held by the adhesive layer.

Electronic parts coated with external electrodes and then dried are arranged and fixed by adhesion on an adhesive material layer provided on a surface of a sagger, in such a manner that the electronic parts will not contact one another. Then, the sagger is inserted into a firing oven, where the external electrodes are baked.

The adhesive material layer acts to immobilize the electronic parts on the way to the baking process, so that the electronic parts are prevented from moving and thus are free from contact with each other. As a result, the external electrodes can be prevented from sticking with one another. Moreover, the external electrodes can be baked without using powder so that there is no sticking of powder to the external electrodes. As a result, the need of the powder removing process after baking is eliminated, and the environmental deterioration due to the dust of the powder can be prevented.

DETAILED DESCRIPTION OF THE PREFERRED EMBODIMENTS

Hereinbelow, embodiments of the present invention are described with reference to FIGS. 1A to 3 of the accompanying drawings.

Figure 1A:
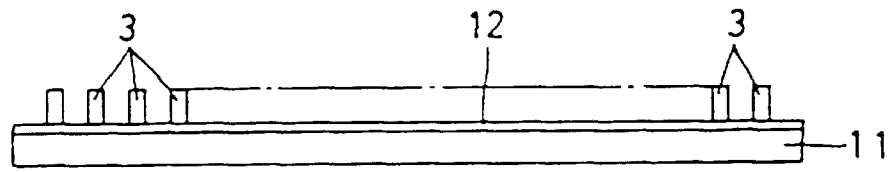
FIGS. 1A and 1B are front views showing the structure of a sagger used to carry out the present invention with electronic parts applied hereto.
Figure 1B:
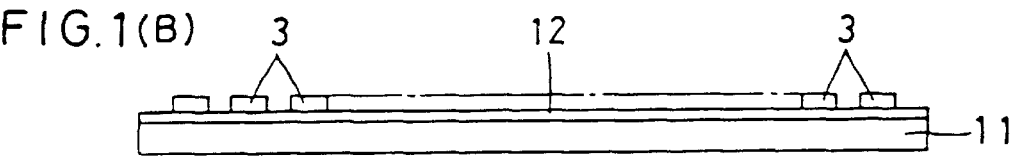

In a first embodiment of the invention as shown in FIGS. 1A and 1B, a sagger 11 used for the baking of external electrodes of electronic parts 3 is made of a material that hardly reacts with the external electrodes. An adhesive material layer 12 is provided on a surface of the sagger 11 on which the electronic parts 3 are placed. Thus, the electronic parts 3 are fixed by adhesion.

The adhesive material layer 12 is formed by coating with an adhesive material or by applying a double coated adhesive tape. The electronic parts 3 to be adhesively immobilized on the adhesive material layer 12 may be fixed either in an erect position as shown in FIG. 1A or in a laid-down position as shown in FIG. 1B. The material of the adhesive material layer 12 may be selected as one that will burn away at relatively low temperatures and that will not adversely affect the electronic parts 3 during the firing process.

Next, the process of baking the external electrodes with the use of the sagger 11 is explained.

Figure 2A:
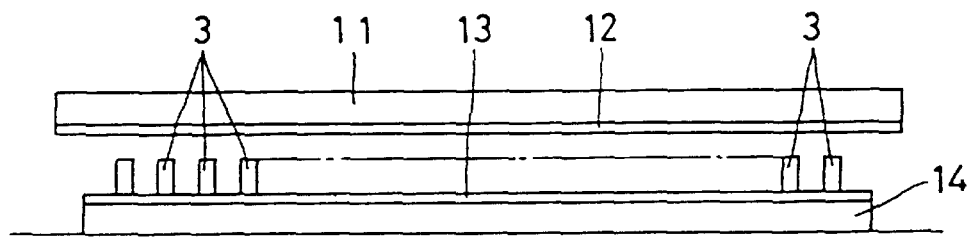
FIGS. 2A, 2B and 2C are front views showing in order the steps of coating external electrodes on the electronic parts by use of the sagger.

As shown in FIG. 2A, a chip holder 14 provided with a holding portion 13 coated on its surface with an adhesive material is prepared separately. A multiplicity of chip electronic parts 3 are mounted on the holding portion 13 of the holder 14 in an array and in an erect posture. Then, one end portion of the chip parts is immersed into a paste of the external electrode material (not shown), whereby the electronic parts are coated with one end external electrode.

Figure 2B:
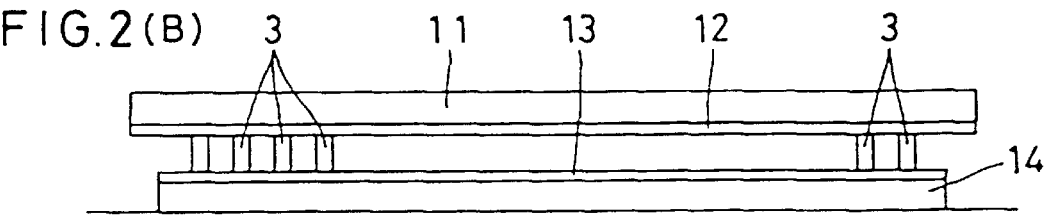
Figure 2C:
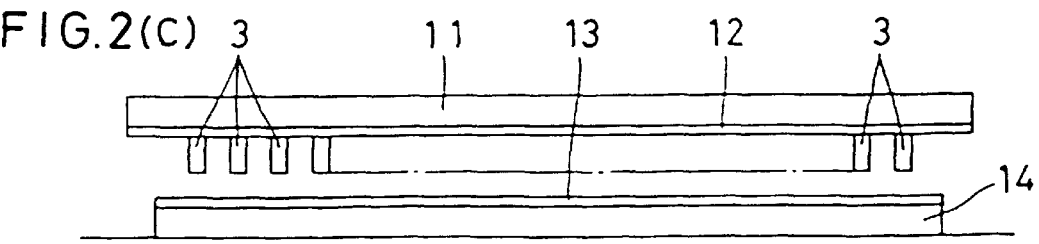

When the external electrode is dried, the sagger 11 is oppositely placed above the chip holder 14 and brought into proximity to the chip holder 14. The adhesive material layer 12 is pressed against the chip parts as shown in FIG. 2B, and thereafter the sagger 11 is separated away. Then, the electronic parts 3 are moved onto the sagger 11 as shown in FIG. 2C. For this operation, the adhesive material layer 12 provided on the sagger 11 is selected so as to have an adhesive force stronger than the holding force of the holding portion 13 of the chip holder 14.

Now that the electronic parts 3 have been moved onto the adhesive material layer 12 of the sagger 11 in this way, the other end portion of the electronic parts 3 is immersed in the paste of the external electrode material. The electronic parts 3 are thereby coated with the other end external electrode, and then dried.

As a result, the electronic parts 3 are coated at both end portions with the external electrodes, and arrayed and fixed on the adhesive material layer 12 of the sagger 11, as shown in FIG. 1A. In this state, the external electrodes are put into a baking process by inserting the sagger 11, as it is, into a firing oven.

In the baking process, the electronic parts 3 are immobilized by the adhesive material layer 12 so that the electronic parts 3 will not move or contact one another during handling. Therefore, the external electrodes are prevented from sticking with one another. Moreover, the adhesive material layer 12 will be burned away. Thus, the electronic parts 3 after the baking of the external electrodes can be taken out from on the sagger 11.

Figure 3:
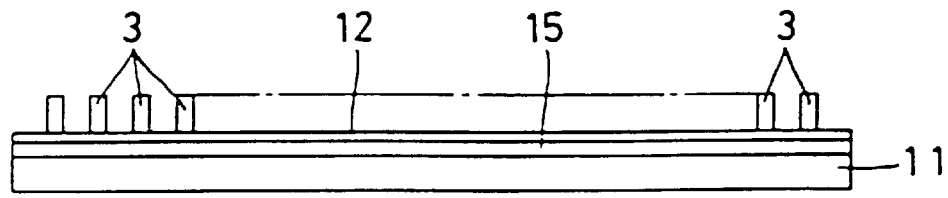
FIG. 3 is a front view showing a second embodiment of the sagger.

Referring next to a sagger 11 which is shown in FIG. 3 and which is a second embodiment of the present invention, a powder coating layer 15 is provided on a surface of the sagger 11. Further, an adhesive material layer 12 on which electronic parts 3 are placed is formed on the coating layer 15.

The powder coating layer 15 is made of a material that reacts little with ceramics and external electrodes in the process of powder baking, by mixing therewith a ceramic similar to that of the electronic parts 3, and by, for example, spray-coating or flame spraying the mixture onto the sagger 11, and then by firing the resulting coated layer.

It is suggested that the surface roughness of the powder coating layer should be more than 50 $\mu$m to reduce the contact area with the chip or electrode surface.

Thus, when the resulting powder coating layer 15 is formed so that its surface has a surface roughness of below 100 $\mu$m, preferably around a few tens of $\mu$m, this allows the powder coating layer 15 to be reduced in its bonding force with the electronic parts 3 after the adhesive material layer 12 has been burned away in the baking process of the external electrodes.

An advantage of this process is that, the electronic parts 3 can be taken off of on the coating layer 15 without difficulties even if the electronic parts 3 come into direct contact with the powder coating layer 15 after the adhesive material layer 12 is burned away in the baking process.

Further, a third embodiment of the present invention is described with reference to FIGS. 4A and 4B and FIGS. 5A and 5B of the accompanying drawings in the following.

In the first and second embodiments of the present invention, an adhesive material layer 12 is provided on a surface of a sagger 11 in the form of a plate, and the adhesive material layer 12 holds an electronic part 3 while an external electrode is baked.

Glass frit and varnish as well as metal powders are compounded in the external electrode of the electronic part 3.

As to materials for the adhesive material layer 12 formed on the sagger 11, materials with good combustibility and ability to be burned away are selected. However, in some cases, due to a varnish component, and more specifically due to the amount of varnish component contained in the external electrode, sudden combustion occurs when the varnish component is burned away by heat, and gas is thereby generated suddenly in a part where the external electrode is in contact with the adhesive material layer 12. As a result, unfavorable defects in view of the appearance or other characteristics of the external electrode can occur.

Figure 4A:
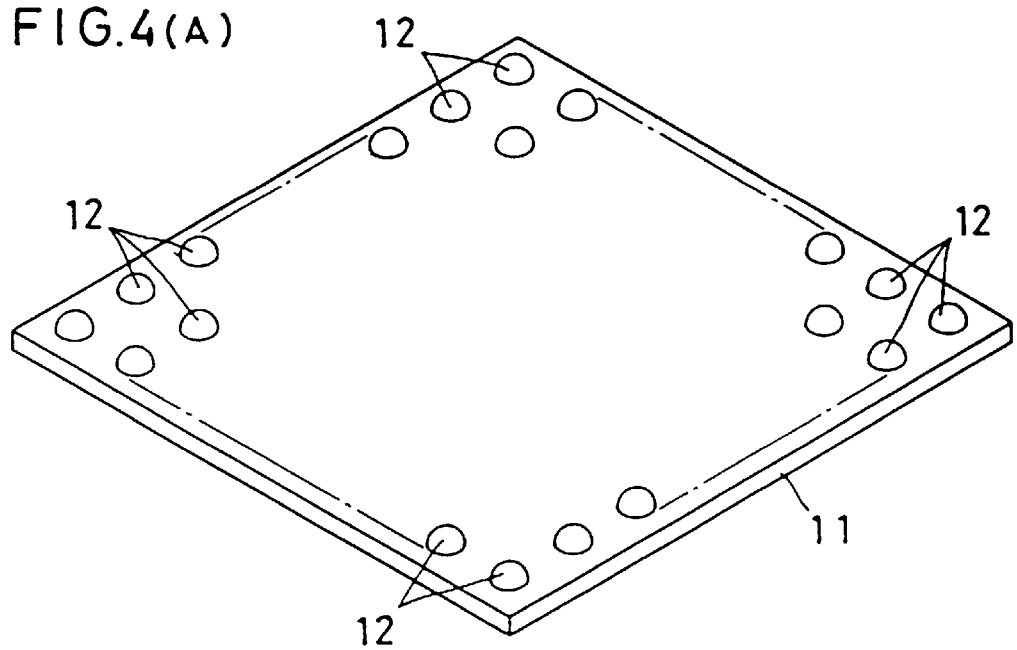
FIG. 4A is a perspective view showing a third embodiment of the sagger.
Figure 4B:
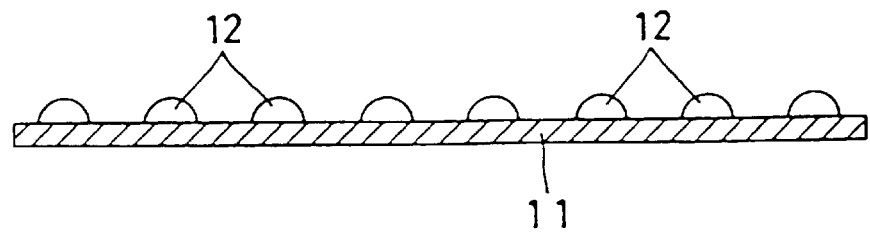
FIG. 4B is a sectional view thereof.
Figure 5A:
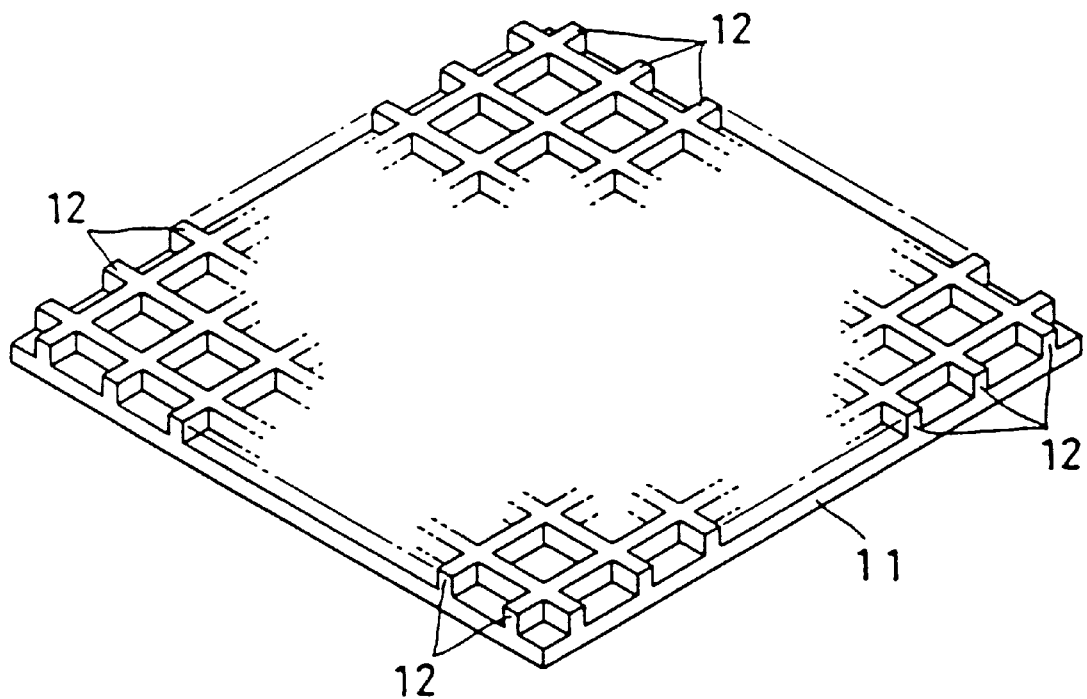
FIG. 5A is a perspective view showing a modification examples of the third embodiment of the sagger.
Figure 5B:
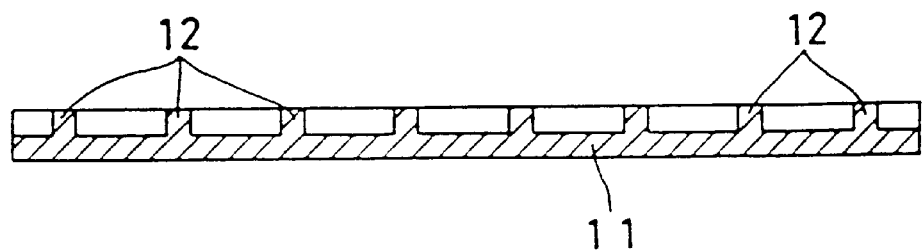
FIG. 5B is a sectional view thereof.
Figure 6A:
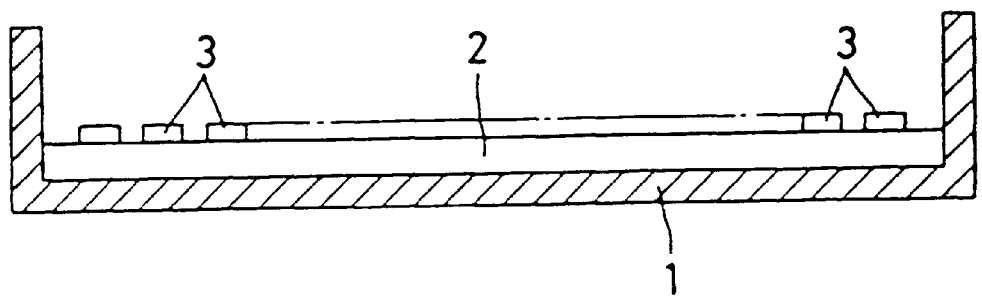
FIG. 6A is a front view showing a conventional sagger.
Figure 6B:
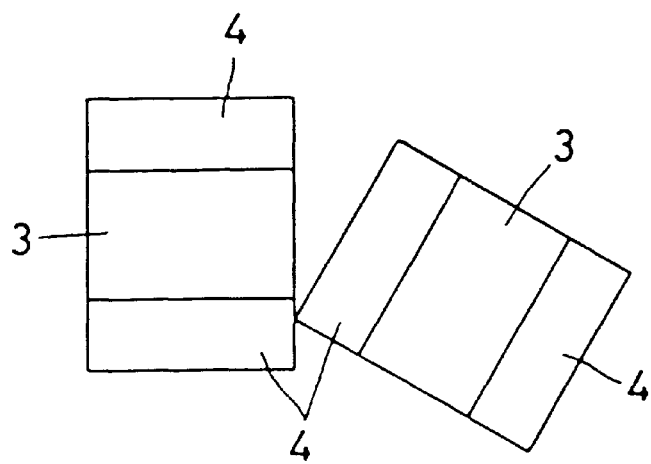
FIG. 6B is a plan view showing inadvertent bonding of the external electrodes of a pair of electronic parts.

In a case like this, the contact area between the adhesive material layer 12 and the external electrode can be decreased by employing the sagger forms shown in FIGS. 4A–5B, and consequently, it is possible to prevent the generation of unfavorable defects in view of the appearance and characteristics of the external electrode. In FIGS. 4A–4B, the adhesive material layer 12 comprises a plurality of separate adhesive material bodies. In FIGS. 5A–5B, the adhesive material layer is formed in a grid pattern.

Materials such as zirconia, mullite, magnesia, cordierite or the like having low reactivity with the external electrode are used for the sagger. In order to improve the mechanical strength, heat resistance and heat capacity of the sagger, base materials such as alumina, nickel or the like can be used, and coated with the above materials to a thickness of 100–200 μm.

The first and second embodiments have been exemplified by cases where the electronic parts 3 are adhesively fixed to the adhesive material layer 12 by making use of the sagger 11 in the process of coating with external electrodes. However, the electronic parts 3 may also be arrayed and mounted onto the adhesive material layer 12 of the sagger 11 after the process of coating the external electrodes on the parts is carried out separately.

The ceramic electronic parts on which external electrodes are baked may include resistor chips, EMI chip filters, multi-layer parts, and the like, in addition to monolithic ceramic capacitors.

As described above, according to the present invention, there is no need to use powder in contact with the electronic parts in the process on baking external electrodes of ceramic electronic parts, so that there is no occurrence of powder sticking to the external electrodes after the baking of the external electrodes. Thus, the process of removing powder is no longer involved.

Also, since the electronic parts are fixedly held by the adhesive material layer, the electronic parts will not be brought into contact with one another in the baking process. Thus, the external electrodes can be prevented from bonding with one another.

Furthermore, it is no longer necessary to lay down powder over the sagger. This prevents environmental deteriorations due to powder scattering. Thus, it becomes possible to continuously carry out the processes from the coating of the external electrodes to the baking of the external electrodes.

Figure 7:
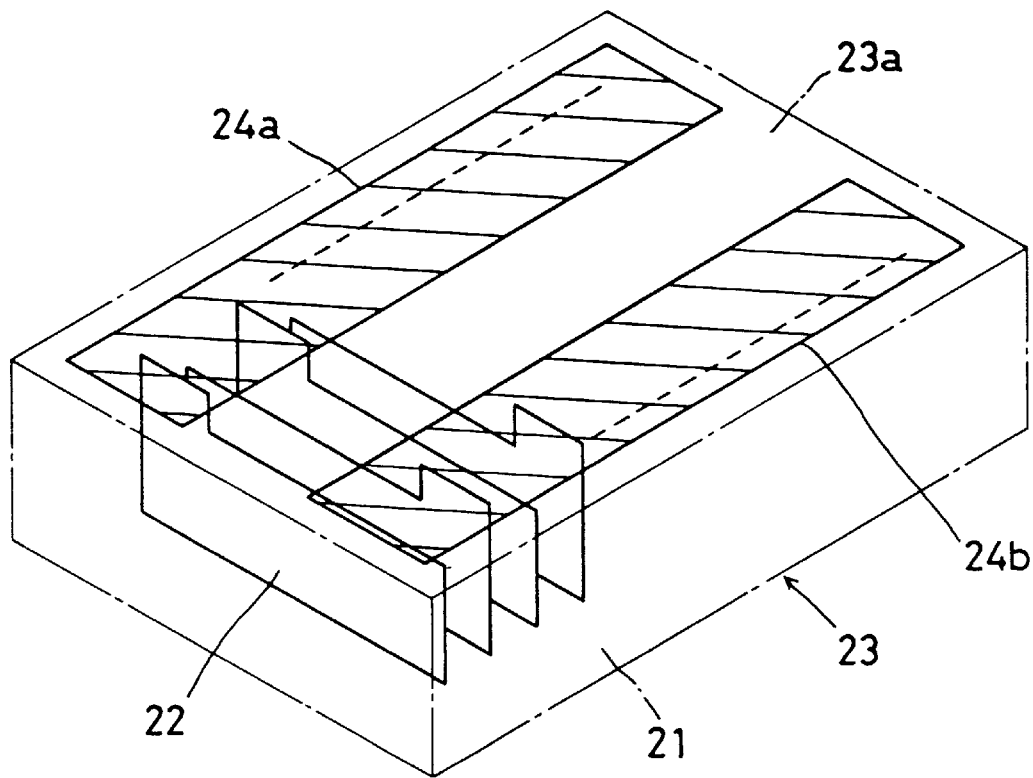
FIG. 7 is a perspective view showing an electronic part fabricated by a method of a fourth embodiment of the invention.

Hereinbelow, a fourth embodiment of the invention is described with reference to the drawings. In this fourth embodiment, as shown in FIG. 7, a ceramic capacitor 23 comprises a pair of external electrodes 24a, 24b which are disposed on the upper surface of the capacitor 23 and conductively connected to respective ones of a plurality of internal electrodes 22 disposed in a ceramic body 21.

Further, FIGS. 8–11 show the steps in a method for fabricating electronic parts with respect to this embodiment.

Figure 8:
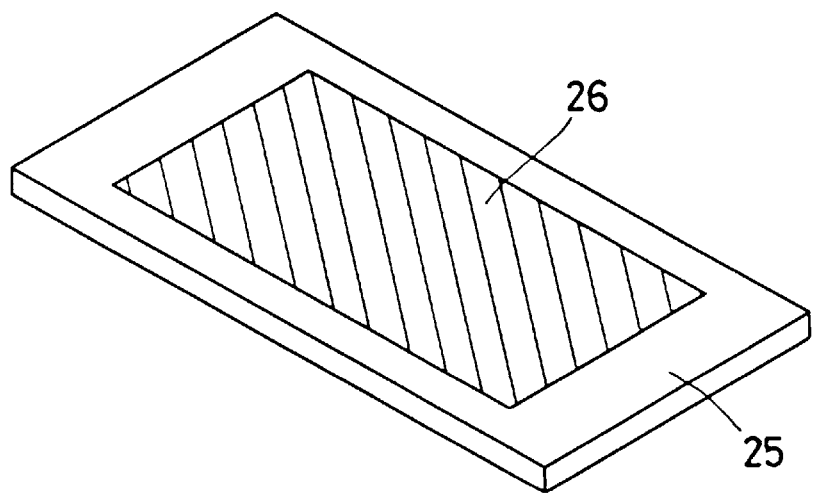
FIG. 8 is a view showing one aspect of the method for fabricating electronic parts with respect to the fourth embodiment of the invention.

First, in the fourth embodiment, as shown in FIG. 8, a double coated adhesive tape 26 (adhesive material) is adhered to the upper surface of a holding jig 25 in the shape of a plate.

Figure 9:
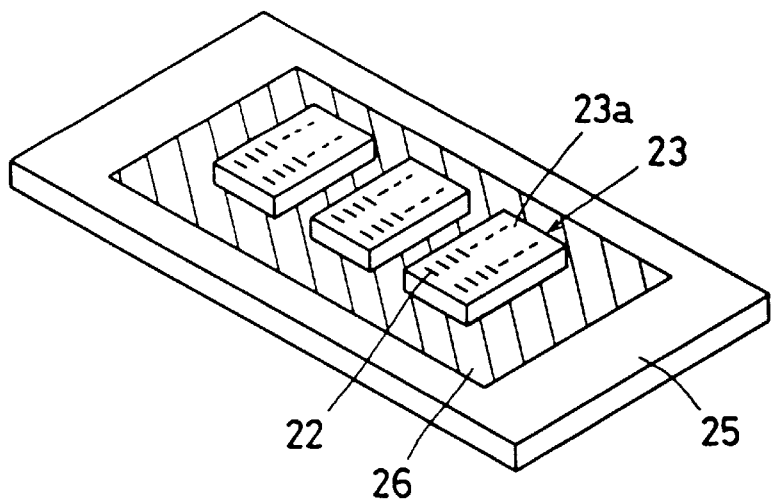
FIG. 9 is a view showing another aspect of the method for fabricating electronic parts with respect to the fourth embodiment of the invention.

Then, as shown in FIG. 9, a plurality of capacitors 23 are arranged on the holding jig 25 with the electrode formative surfaces 23a on which the external electrodes 24a, 24b of the capacitors 23 are to be formed are turned upward and the opposite surface is adhered to the double-coated adhesive tape 26 applied to the holding jig 25.

Figure 10:
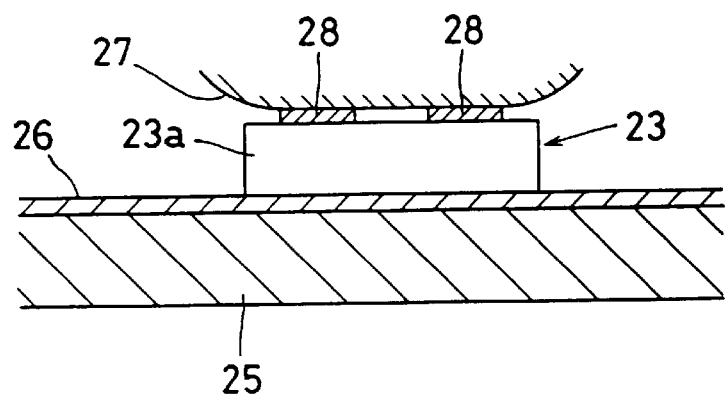
FIG. 10 is a view showing a further aspect of the method for fabricating electronic parts with respect to the fourth embodiment of the invention.

Further, as shown in FIG. 10, for example, conductive paste 28 for forming an electrode in a fixed position on the electrode formative surface 23a of the capacitor 23 adhered on the holding jig 25 and held thereby is printed by offset printing using a pad 27 for applying electrode paste.

Figure 11:
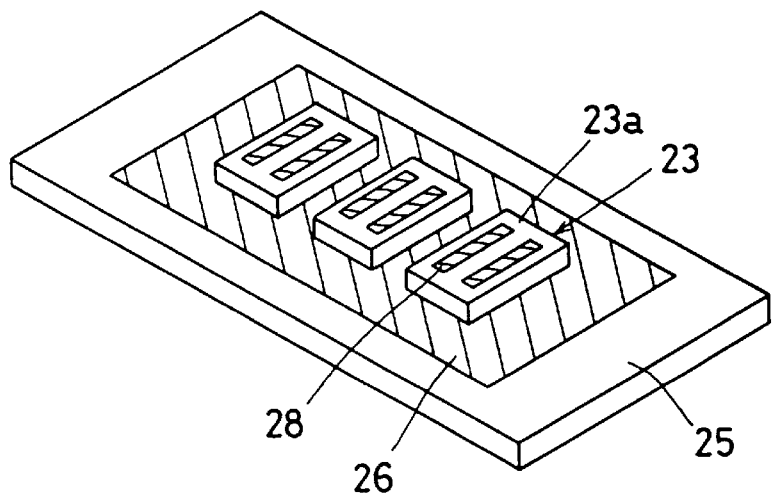
FIG. 11 is a view showing yet another aspect of the method for fabricating electronic parts of the fourth embodiment of the invention.

Moreover, as shown in FIG. 11, while adhered on the holding jig 25 through the double-coated adhesive tape 26 and held thereby, the capacitor 23 on which the conductive paste 28 is printed on the electrode formative surface 23a is put in a firing oven (not shown) together with the holding jig 25 and fired at the temperature of 800° C. and the conductive paste 28 is baked thereby. As a result, electronic parts as shown in FIG. 7 can be obtained. Since the double-coated adhesive tape 26 is burned away and removed at about the temperature of 300° C. in this firing process, electronic parts taken out from the firing oven after firing are free thereof.

In the fourth embodiment, a capacitor 23 in which a pair of electrodes 24a, 24b is arranged on only one of the outer surfaces 23a (the upper surface in FIG. 7) of the capacitor 23 was described as an example. As mentioned above, since firing is conducted while the element is adhered to the holding jig and held thereby, the method for fabricating electronic parts of the invention is especially useful when the electronic parts have electrodes arranged on only one of their surfaces. However, the invention can be applied also when the electronic parts have electrodes formed not only on one surface but on the other surface as well. In other words, the invention can be applied when electrodes are formed on a specific surface and the invention can be also applied when respective electrodes are formed both surfaces.

Further, in the fourth embodiment, an example for manufacturing a ceramic capacitor was described. However, electronic parts to which the invention can be applied are not restricted to a ceramic capacitor. The invention can be applied generally to various electronic parts comprising electrodes to be formed at least on one outer surface of an element.

Additionally, in the fourth embodiment, a double-coated adhesive tape is used as an adhesive for adhering an element to a holding jig. However, the adhesive is not restricted to this but various other adhesives can also be used. Although any kind of adhesive can be used, it is preferable to use an adhesive which burns away at a lower temperature than a baking temperature of conductive paste for forming electrodes.

The invention is not restricted to the above embodiment with respect to other further points as well, and it is possible to add various applications and modifications to the invention within the scope of the subject matter regarding a shape of an element, concrete patterns and arrangement positions of electrodes, devices for applying electrode paste, a shape and materials of a holding jig, conditions for firing (conditions for baking conductive paste) or the like.

As mentioned above, in a method for fabricating electronic parts of the fourth embodiment of the invention, the surface on which electrodes are disposed and the opposite surface of an element are adhered on a holding jig through an adhesive. The element is held on a holding device, after applying conductive paste for forming electrodes in a fixed position of an electrode formative surface. Since the conductive paste is baked by firing the element together with the holding jig in a firing oven and the adhesive can be thereby burned away, it is possible to reliably prevent the element from adhering to reliably an electrode paste applying device. Further, since it is possible to omit the use of a cover mask, adhesion of the element to the conductive paste on the cover mask, which can occur in a conventional method using a cover mask, can also be prevented.

Therefore, even when a size of the element and the electrode formed on the element are small, adherence and accompaniment of the element with the electrode paste applying means and a cover mask can be reliably prevented and as a result, it is possible to fabricate electronic parts efficiently wherein the electrodes are disposed on at least one of the outer surfaces of the element.

What is claimed is:

1. A method for fabricating an electronic part comprising the steps of:

employing an adhesive means for adhering a surface of the electronic part to a holding jig;

while the part is adhered to the holding jig, applying electrode paste to a surface of the electronic part on which electrodes are to be disposed;

and then, while the part is adhered to the holding jig, putting the part in a firing oven together with the holding jig and firing it, thereby baking the electrode paste and burning away the adhesive means.

2. The method of claim 1, wherein said adhesive means comprises double-coated adhesive tape.

3. The method of claim 1, wherein said adhesive means comprises a plurality of separate adhesive material bodies.

4. The method of claim 1, wherein said adhesive means is formed in a grid pattern.

5. A method for fabricating an electronic part comprising the steps of:

adhering a surface of the electronic part to a holding jig with an adhesive material;

while the part is adhered to the holding jig, applying electrode paste to a surface of the electronic part on which electrodes are to be disposed;

and then, while the part is adhered to the holding jig, putting the part in a firing oven together with the holding jig and firing it, thereby baking the electrode paste and burning away the adhesive material.

6. The method of claim 5, wherein said adhesive material comprises double-coated adhesive tape.

7. The method of claim 5, wherein said adhesive material comprises a plurality of separate adhesive material bodies.

8. The method of claim 5, wherein said adhesive material is formed in a grid pattern.

* * * * *